United States Patent
Dauth et al.

[11] Patent Number: 6,160,148
[45] Date of Patent: Dec. 12, 2000

[54] ORGANOSILICON COMPOUNDS CONTAINING (METH) ACRYLATE GROUPS AND OXYALKYLENE GROUPS

[75] Inventors: Jochen Dauth, Burghausen; Klaus Schnitzer, Julbach, both of Germany

[73] Assignee: Wacker-Chemie GmbH, Munich, Germany

[21] Appl. No.: 09/090,826

[22] Filed: Jun. 4, 1998

[30] Foreign Application Priority Data

Jun. 12, 1997 [DE] Germany ............ 197 24 948

[51] Int. Cl.[7] .................. C07F 7/08; C07F 7/10
[52] U.S. Cl. ................... 556/419; 516/440
[58] Field of Search ................. 556/419, 440

[56] References Cited

U.S. PATENT DOCUMENTS

| | | |
|---|---|---|
| 4,261,875 | 4/1981 | LeBoeuf . |
| 4,294,974 | 10/1981 | LeBoeuf . |
| 5,374,483 | 12/1994 | Wright . |

FOREIGN PATENT DOCUMENTS

| | | |
|---|---|---|
| 0230342 | 1/1987 | European Pat. Off. . |
| 0400827 | 5/1990 | European Pat. Off. . |
| 0470613 | 8/1991 | European Pat. Off. . |
| 0475363 | 9/1991 | European Pat. Off. . |
| 0719836 | 12/1995 | European Pat. Off. . |

Primary Examiner—Paul F. Shaver
Attorney, Agent, or Firm—Brooks & Kushman P.C.

[57] ABSTRACT

Organosilicon compounds containing (meth)acrylate groups and oxyalkylene groups and comprising units of the formula $$A_a A'_u R_b SiX_c O_{(4-a-b-c-u)/2}, \quad (I)$$

where R is as defined in claim 1,

X are identical or different and are each a radical of the formula —OR$^1$ where R$^1$ is a hydrogen atom or an alkyl radical having from 1 to 8 carbon atoms in which ether oxygen atoms may be present, or a radical of the formula $$-R^2\{[CH(CH_3)CH_2O]_e[CH_2CH_2O]_f[(CH_2)_4O]_g R^3\}_{y-1}, \quad (II)$$

where R$^2$, R$^3$, e, f, g and y are as defined in claim 1, A is a radical of the formula

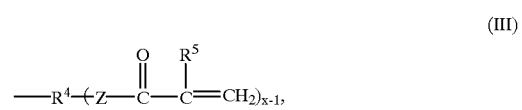
(III)

where R$^4$, R$^5$ and x are as defined in claim 1, A' is a radical of the formula

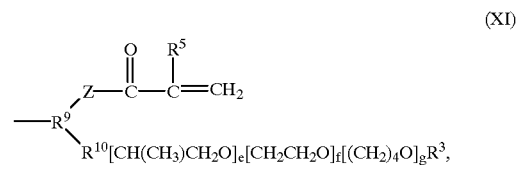
(XI)

where R$^3$, R$^5$, R$^9$, R$^{10}$, e, f and g are as defined in claim 1, a is 0, 1 or 2, u is 0, 1 or 2, b is 0, 1, 2 or 3 and c is 0, 1, 2 or 3, with the proviso that the sum $a+b+c+u \leq 4$ and the organosilicon compound contains at least one radical A and at least one radical of the formula (II) or at least one radical A' per molecule.

14 Claims, No Drawings

ORGANOSILICON COMPOUNDS CONTAINING (METH) ACRYLATE GROUPS AND OXYALKYLENE GROUPS

TECHNICAL FIELD

The invention relates to organosilicon-oxyalkylene copolymers containing (meth)acrylate groups, a process for preparing them and their use.

BACKGROUND OF THE INVENTION

Hydrophilic silicon compounds and use of these compounds for producing contact lenses are described in DE-A 30 03 300 (American Optical Corp., published on Aug. 7, 1980). The weakly hydrophilic silicones contain hydroxypropyl groups and no polyoxyalkylenes and the esterification is carried out using the not unproblematical methacryloyl chloride. DE-B 1 270 716 (Dow Corning Corp., published on Jun. 20, 1968) discloses means of improving the adhesion of polymers to substrates. The corresponding compounds are prepared by hydrolysis and condensation of acrylated oxyalkylenesilanes or polyoxyalkylenesilanes. This does not give a separate distribution of acrylate and polyoxyalkylene groups along the polymer backbone.

Hydrophilic silicones having epoxy functionability as reactive groups are described in EP-A 470 613 (Union Carbide Chemicals and Plastics Co., issued on Feb. 12, 1992). Hydrophilic silicones without further reactive groups are described in EP-A 475 363 (Dow Corning Toray Silicone Co., issued on Mar. 18, 1992). These are prepared by reacting (meth)acrylated polyoxyalkylenes with polysiloxanes containing amino groups in a reaction similar to a Michael addition, which prevents obtaining products containing residual acrylate groups on the polysiloxane. Finally, EP-A 400 827 (Hoechst Celanese Corp., issued on Dec. 5, 1990) describes oxymethylene polymers having polysiloxane side chains. However, that application does not describe higher oxyalkylene polymers.

For the purposes of the present invention, the term organopolysiloxanes refers to silanes, dimeric, oligomeric and polymeric siloxanes.

SUMMARY OF THE INVENTION

The invention pertains to organosilicon compounds containing (meth)acrylate groups and oxyalkylene groups comprising units of the formula:

$$A_aA'_{a'}R_bSiX_cO_{(4-a-a'-b-c-u)/2} \quad (I),$$

where A and A' are (meth)acrylate-containing groups, R is hydrocarbon radical, and X is an alkoxy radical or an SiC-bonded oxyalkyl- or polyoxyalkyl-substituted di- or trivalent hydrocarbon radical, A, A', R, and X being defined in greater detail below. The organosilicon compounds contain at least one radical A and one oxyalkyl- or polyoxyalkyl-substituted di- or trivalent hydrocarbon, or at least one radical A' per molecule.

DESCRIPTION OF THE PREFERRED EMBODIMENTS

The invention provides organosilicon compounds containing (meth)acrylate groups and oxyalkylene groups and comprising units of the formula $$A_aA'_{a'}R_bSiX_cO_{(4-a-a'-b-c-u)/2} \quad (I),$$

where

R can be identical or different and are each a monovalent, SiC-bonded, substituted or unsubstituted hydrocarbon radical having from 1 to 22 carbon atoms, X are identical or different and are each a radical of the formula —OR¹ where R¹ is a hydrogen atom or an alkyl radical having from 1 to 8 carbon atoms in which ether oxygen atoms may be present, or a radical of the formula $$-R^2\{[CH(CH_3)CH_2O]_e[CH_2CH_2O]_f[(CH_2)_4O]_gR^3\}_{y-1} \quad (II),$$

where $R^2$ is SiC-bonded divalent or trivalent hydrocarbon radical having from 2 to 60 carbon atoms which may be interrupted by one or more oxygen atoms and is substituted by one or more groups of the formulae

—NHR³—, and —S—, preferably

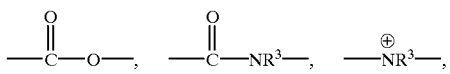

and —NHR³—, y is, corresponding to the valence of radical $R^2$, 2 or 3, $R^3$ is a hydrogen atom or a hydrocarbon radical having from 1 to 20 carbon atoms which may be substituted by a —C(O)— group, and e, f and g are each, independently of one another, 0 or an integer from 1 to 200, with the proviso that the sum e+f+g≧1, A is a radical of the formula

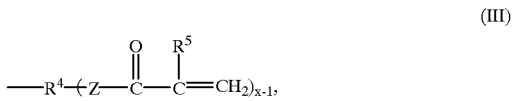

(III)

where $R^4$ is a divalent or trivalent hydrocarbon radical having from 2 to 60 carbon atoms which may be interrupted by one or more oxygen atoms, x is, corresponding to the valence of radical $R^4$, 2 or 3, Z is a radical —O— or —NR³— where $R^3$ is as defined above, with particular preference being given to —O—, and $R^5$ is a hydrogen atom or a methyl group, with preference being given to a hydrogen atom, A' is a radical of the formula

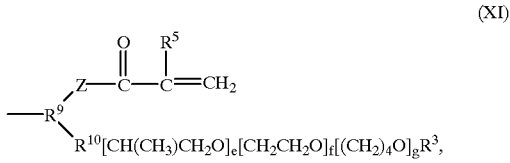

(XI)

where $R^9$ is a trivalent hydrocarbon radical having from 2 to 60 carbon atoms which may be interrupted by one or more oxygen atoms, $R^{10}$ is a divalent hydrocarbon radical having from 2 to 20 carbon atoms which may be interrupted by one or more oxygen atoms and is substituted by one or more groups of the formulae

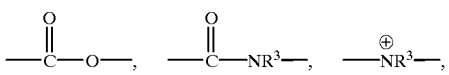

—NHR³—, and —S—, preferably

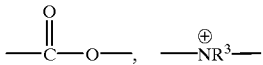

and —NHR³—,
and R⁵, R³, e, f and g are as defined above,
a is 0, 1 or 2,
u is 0, 1 or 2,
b is 0, 1, 2 or 3 and
c is 0, 1, 2 or 3,
with the proviso that the sum a+b+c+u≦4 and the organosilicon compound contains at least one radical A and at least one radical of the formula (II), or at least one radical A' per molecule.

The organosilicon compounds of the invention can be either silanes, i.e. compounds of the formula (I) where a+b+c+u=4, or siloxanes, i.e. compounds comprising units of the formula (I) where a+b+c+u≦3. The organosilicon compounds of the invention are preferably organopolysiloxanes, in particular ones which consist of units of the formula (I).

If the organosilicon compounds of the invention are organopolysiloxanes, the average value of a is preferably from 0.001 to 1.0, particularly preferably from 0.01 to 0.5, the average value of b is preferably from 0 to 3.0, particularly preferably from 0.2 to 2.5, the average value of c is preferably from 0.001 to 3.0, particularly preferably from 0.01 to 2, and the average value of u is preferably from 0.001 to 1, particularly preferably from 0.01 to 0.5.

The organosilicon compounds of the invention preferably have an average molecular weight $M_n$, of from 400 to 1,000,000 g/mol, particularly preferably from 5000 to 150,000 g/mol, and preferably have a viscosity of from 10 to 1,000,000 mm²/s, particularly preferably from 20 to 100,000 mm²/S, in each case at 25° C.

The organosilicon compounds of the invention can also be wax-like or solid.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, and cycloheptyl radicals and methylcyclohexyl radicals; alkenyl radicals such as the vinyl, allyl, 3-butenyl, 5-hexenyl, 1-propenyl, and 1-pentenyl radicals; alkynyl radicals such as the ethynyl, propargyl and 1-propynyl radicals; aryl radicals such as the phenyl, naphthyl, anthryl and phenanthryl radicals; alkaryl radicals such as o-, m-, p-tolyl radicals; xylyl radicals and ethylphenyl radicals; and aralkyl radicals such as the benzyl radical, the phenylethyl radical, and the phenylnonyl radical.

Examples of substituted hydrocarbon radicals R are haloalkyl radicals such as the 3,3,3-trifluoro-n-propyl radical, the 2,2,2,2',2',2'-hexafluoroisopropyl radical and the heptafluoroisopropyl radical, and haloaryl radicals such as the o-, m- and p-chlorophenyl radicals.

The radical R is preferably an unsubstituted hydrocarbon radical having from 1 to 12 carbon atoms, with particular preference being given to the methyl radical.

Examples of alkyl radicals $R^1$ are the examples of alkyl radicals having up to 8 carbon atoms listed for the radical R and also the methoxyethyl and ethoxyethyl radicals. The radical $R^1$ is preferably a hydrogen atom, a methyl, ethyl, propyl or butyl group, in particular a methyl or ethyl group.

Examples of radicals $R^2$ are

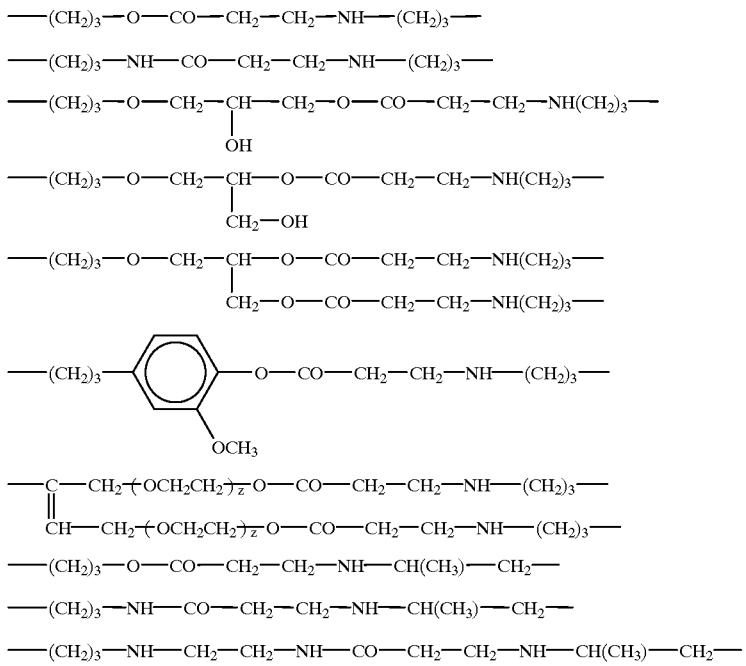

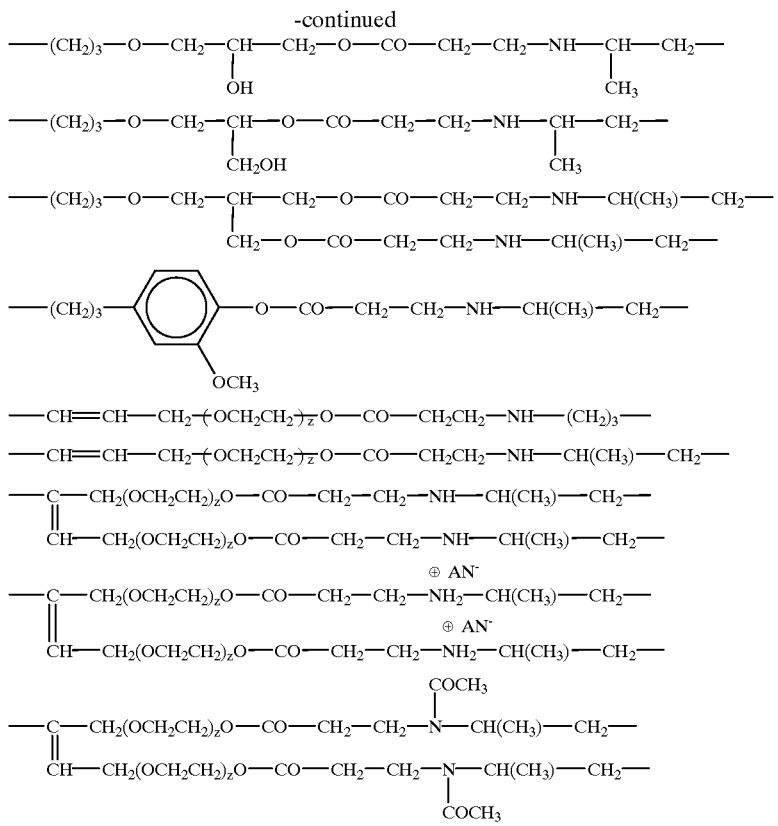

where z is 0 or an integer from 1 to 10, AN⁻ is an anion such as Cl⁻, $CH_3COO^-$ or $HSO_4^-$ and the radicals are each shown in such a way that the left-hand bond forms the link to the Si atom.

The radical $R^2$ is preferably

R and also —CO—$CH_3$, —CO—$CH_2$—$CH_3$ and —CO—$(CH_2)_3$—$CH_3$. The radical $R^3$ is preferably a hydrogen atom, a methyl, butyl or phenyl group.

Examples of radicals X of the formula (II) are

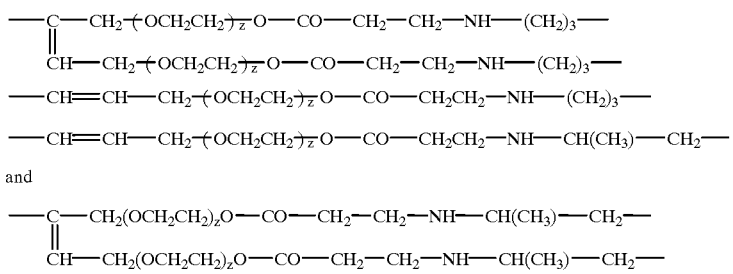

where z is as defined above and the radicals are each shown in such a way that the left-hand bond forms the link to the Si atom.

Examples of radicals $R^3$ are the examples of hydrocarbon radicals having from 1 to 20 carbon atoms listed for radical

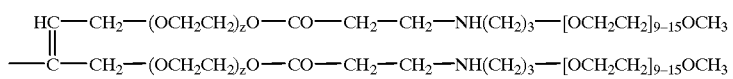

-continued

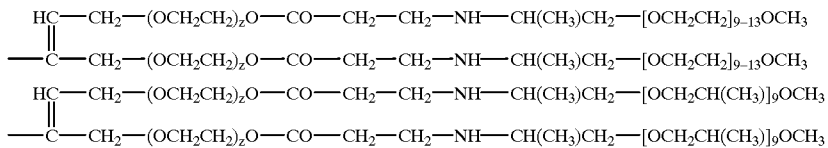

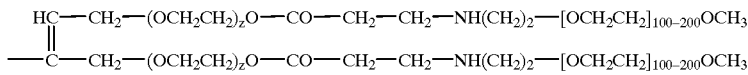

where z is as defined above.

The radicals of the formula (II) are preferably

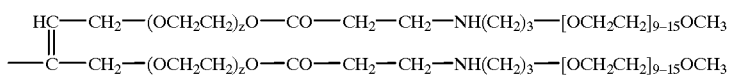

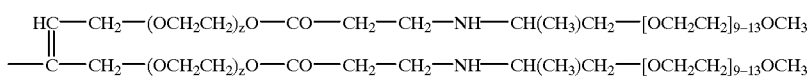

where z is as defined above.

The sum e+f+g preferably has a value of from 2 to 50, particularly preferably from 4 to 30.

X is preferably a radical —OR$^1$ where R$^1$ is as defined above, with particular preference being given to —OCH$_3$ and —OC$_2$H$_5$.

Examples of radical R$^4$ are radicals of the formulae —(CH$_2$)$_3$—,

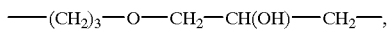

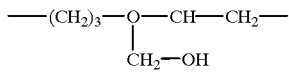

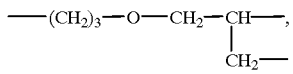

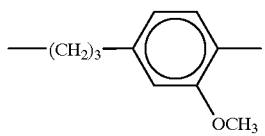

and

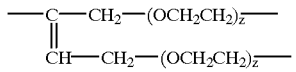

where z is as defined above and the radicals are each shown in such a way that the left-hand bond forms the link to the Si atom. Particular preference is given to

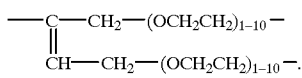

The radical A is preferably

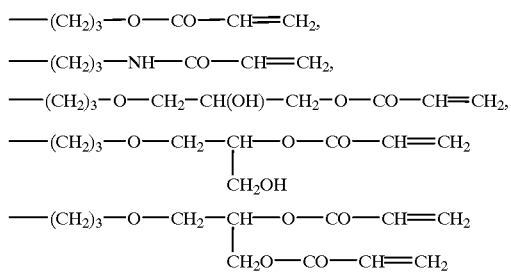

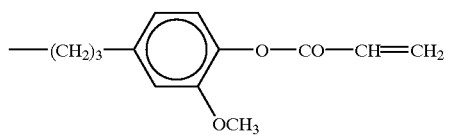

and

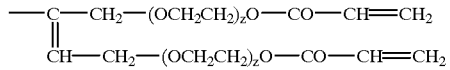

where z is as defined above. Particular preference is given to

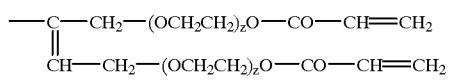

where z=1 to 10.

Examples of radicals R$^9$ are the examples of trivalent radicals listed for R$^4$.

Examples of radicals R$^{10}$ are

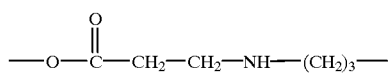

-continued

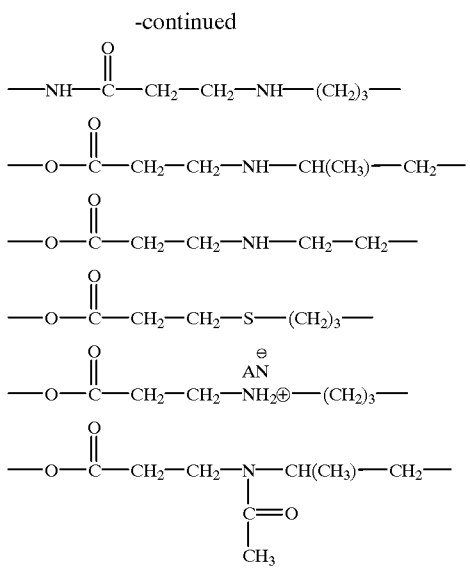

Examples of radicals A' are

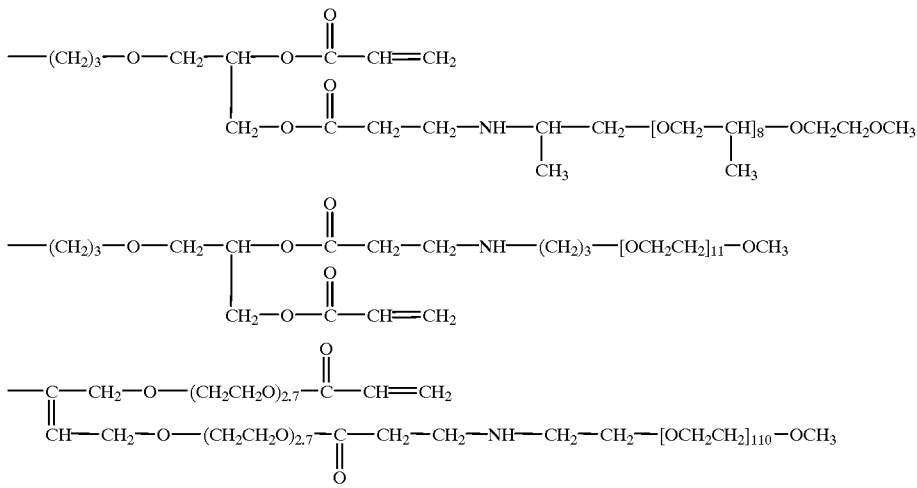

The organosilicon compounds of the invention are preferably ones of the formula $$A'_vX_iA_hR_{3-h-i-v}SiO(SiX_iR_{2-i}O)_o\text{—}(SiA'_vR_{2-h-v}A_hO)_mSiA'_vX_iA_hR_{3-h-i-v} \quad (IV),$$

where X, A, A' and R are as defined above, h can be identical or different and in each case is 0, 1 or 2, i can be identical or different and in each case is 0, 1 or 2, v can be identical or different and in each case is 0, 1 or 2, where h+i+v≦3 in the terminal units and h+v≦2 in the units in the chain, m and o are each 0 or an integer from 1 to 1000, with the proviso that at least one radical of the formula (II) and at least one radical A or at least one radical A' are present per molecule and the o units $(SiX_iR_{2-i}O)$ and the m units $(SiA'_vR_{2-h-v}A_hO)$ can be distributed in any way in the molecule.

The organosilicon compounds of the invention preferably have a polyoxyalkylene content of from 2 to 50 percent by weight, particularly preferably from 5 to 40 percent by weight.

The organosilicon compounds of the invention preferably have a (meth)acrylate group content of from 0.001 to 0.2 percent by weight, particularly preferably from 0.01 to 0.1 percent by weight.

The novel organosilicon compounds containing (meth)acrylate groups and oxyalkylene groups can, if desired, be additionally reacted with acylating materials such as acetic anhydride, acetyl chloride or isocyanates to neutralize excess amine groups for further Michael additions.

The invention further provides a process for preparing organosilicon compounds containing (meth)acrylate groups and oxyalkylene groups, which comprises reacting organosilicon compounds comprising units of the formula $$A_dR_bSi(OR^1)_kO_{(4-d-b-k)/2} \quad (V),$$

where R, R¹, A and b are as defined above, d is 0, 1 or 2 and k is 0, 1, 2 or 3, with the proviso that the sum d+b+k≦4 and at least two (meth)acrylate groups are present per molecule, i.e. at least two radicals A of the formula (III) if $R^4$ is a divalent radical or at least one radical A of the formula (III) if $R^4$ is a trivalent radical,
with polyoxyalkylenes selected from among monoaminated polyoxyalkylenes of the formula

$$HNR^6R^7\text{—}[\text{—}OCH(CH_3)CH_2]_e[CH_2CH_2O]_f[(CH_2)_4O]_gR^3 \quad (VI)$$

and/or those of the formula

$$HSR^7\text{—}[\text{—}OCH(CH_3)CH_2]_e[CH_2CH_2O]_f[(CH_2)_4O]_gR^3 \quad (VI'),$$

where $R^3$, e, f and g are as defined above, $R^6$ is a hydrogen atom or a monovalent hydrocarbon radical having from 1 to 8 carbon atoms, with preference being given to a hydrogen atom, and $R^7$ is a divalent hydrocarbon radical having from 1 to 12 carbon atoms.

The organosilicon compounds used according to the invention can be either silanes, i.e. compounds of the formula (V) where d+b+k=4, or siloxanes, i.e. compounds comprising units of the formula (V) where d+b+k≦3. The organosilicon compounds used according to the invention are preferably organopolysiloxanes, in particular ones consisting of units of the formula (V).

If the organosilicon compounds used according to the invention are organopolysiloxanes, the average value of d is preferably from 0.001 to 1.0, particularly preferably from 0.01 to 0.5, the average value of b is preferably from 0 to 3.0, particularly preferably from 0.2 to 2.5, and the average value of k is preferably from 0.001 to 3.0, particularly preferably from 0.01 to 2.

Examples of radicals $R^7$ are linear or branched alkylene radicals such as the 1,2-ethylene, 1,3-propylene, 1,2-propylene, 1,3-(2-methylpropylene) and dimethylmethylene radicals. $R^7$ is preferably a 1,3-propylene or 1,2-propylene radical.

Examples of hydrocarbon radicals $R^6$ are the examples of hydrocarbon radicals having from 1 to 8 carbon atoms listed for R, with preference being given to the methyl, butyl and cyclohexyl radicals and particular preference being given to the methyl radical.

The organosilicon compounds used in the process of the invention are preferably organopolysiloxanes containing lateral and/or terminal acrylate or diacrylate groups, particularly preferably ones having double bond equivalents of from 200 g/mol of C=C to 100,000 g/mol of C=C.

The monoaminated polyoxyalkylenes of the formula (VI) used according to the invention are preferably $H_2NCH_2CH_2(OCH_2CH_2)_{10-20}OH$, $H_2N(CH_2)_3(OCH_2—CH(CH_3))_{6-9}OH$
$H_2NCH_2CH_2(OCH_2CH_2)_{100-200}OCH_3$
$H_2N(CH_2)_3(OCH_2—CH(CH_3))_{11-15}OCH_3$
$H_2NCH_2CH_2(OCH_2CH_2)_{50-70}O—CO—CH_3$
$H_2N(CH_2)_3(OCH_2—CH(CH_3))_{20-25}O—CO—CH_3$
$H_2N(CH_2)_3(OCH_2CH_2)_{4-8}OH$
$H_2N(CH_2)_3(OCH_2CH_2)_{20-30}OCH_3$
$H_2N—CH(CH_3)—CH_2(OCH_2—CH(CH_3))_{7-9}OH$
$H_2N(CH_2)_3(OCH_2CH_2)_{1-5}O—CO—CH_3$
$H_2N—CH(CH_3)—CH_2(OCH_2CH(CH_3))_{8-10}OCH_2CH_2OCH_3$
$H_2N—CH(CH_3)CH_2(OCH_2CH_2)_{80-90}OH$
$H_2N—CH(CH_3)CH_2(OCH_2CH(CH_3))_{15-20}O—CO—CH_3$
$H_2N—CH(CH_3)CH_2(OCH_2CH_2)_{9-13}OCH_3$
$H_2N—CH_2CH_2(O(CH_2)_4)_{3-7}OH$
$H_2N—CH(CH_3)CH_2(OCH_2CH_2)_{40-50}O—CO—CH_3$
$H_2N—CH_2CH_2(O(CH_2)_4)_{15-17}OCH_3$
$H_2N—CH_2CH_2(OCH_2CH(CH_3))_{8-12}OH$
$H_2N—CH_2CH_2(O(CH_2)_4)_{9-12}O—CO—CH_3$
$H_2N—CH_2—CH_2(OCH_2CH(CH_3))_{16-20}OCH_3$
$H_2N—CH(CH_3)CH_2(O(CH_2)_4)_{5-8}OH$
$H_2N—CH_2—CH_2(OCH_2CH(CH_3))_{3-7}O—CO—CH_3$
$H_2N—CH(CH_3)CH_2(O(CH_2)_4)_{25-30}OCH_3$
$H_2N—CH_2—CH(CH_3)—(OCH_2CH_2)_{8-12}OCH_3$
$H_2N—CH_2—CH(CH_3)—(OCH_2CH(CH_3))_{4-6}OCH_3$, and
$H_2N—CH_2—CH(CH_3)—(O(CH_2)_4)_{5-8}O—CO—CH_3$.

The monoaminated polyoxyalkylenes of the formula (VI) used according to the invention are particularly preferably $H_2N—CH_2—CH_2(OCH_2CH_2)_{100-200}OCH_3$
$H_2N—CH(CH_3)—CH_2(OCH_2CH_2)_{9-13}OCH_3$
$H_2N—CH(CH_3)—CH_2(OCH_2CH(CH_3))_{8-10}OCH_2CH_2OCH_3$, and
$H_2N—CH_2CH_2(O(CH_2)_4)_{15-17}OH$.

The polyoxyalkylenes of the formula (VI') used according to the invention are preferably $HS—CH_2—CH_2—[OCH_2—CH_2—]_{110}—OCH_3$.

In the process of the invention, the polyoxyalkylenes used are preferably those of the formula (VI).

The organosilicon compounds comprising units of the formula (V) and the monoaminated polyoxyalkylenes of the formula (VI) or the polyoxyalkylenes of the formula (VI') used in the process of the invention are commercial products or can be prepared by methods known in chemistry.

In the process of the invention, preference is given to using from 0.001 to 0.999 mol of polyoxyalkylene of the formula (VI) and/or (VI'), particularly preferably from 0.01 to 0.9 mol, in particular from 0.1 to 0.9 mol, per mol of (meth)acrylate radicals in the organosilicon compound comprising units of the formula (V) which is used.

All known compounds which catalyze the reactions similar to the Michael reaction, for example glacial acetic acid, tin(IV) chloride, sodium methoxide, phosphonium, ammonium and sulfonium salts or alkali metal amides can be used in the process of the invention, although this is not preferred.

The process of the invention can be carried out in bulk, solution or emulsion, with preference being given to the process in solution or emulsion.

If the process of the invention is carried out in solution, use can be made of organic solvents, water or mixtures thereof, with the addition of organic solvents being preferred.

Examples of organic solvents which may be used are toluene, xylene, tetrahydrofuran, n-butyl acetate, isopropanol and dimethoxyethane. If solvents are used, preference is given to isopropanol and toluene.

If solvents are used, the amounts employed are preferably from 5 to 50 percent by weight, based on the total weight of the reactive components.

If use is made of solvents, they are preferably removed in a known way, for example by distillation, after the reaction according to the invention.

If the process of the invention is carried out in emulsion, the polyoxyalkylene compounds of the formula (VI) and/or (VI') are initially charged in a partial amount of water together with, if appropriate, ionic or nonionic emulsifiers. The organosilicon compound of the formula (V) is then emulsified under the action of shear forces (e.g. Turrax® stirrer) and added. The emulsion can, if appropriate, be further diluted with water.

The process of the invention is preferably carried out at the pressure of the surrounding atmosphere, i.e. at from 900 to 1100 hPa. However, it can also be carried out at higher or lower pressures.

Furthermore, the process of the invention is preferably carried out at a temperature of from 25° C. to 150° C., particularly preferably from 25° C. to 120° C., in particular from 25° C. to 100° C.

The components used in the process of the invention can in each case be one type of such a component or a mixture of at least two types of a respective component.

The organopolysiloxanes containing (meth)acrylate groups and polyoxyalkylene groups obtained by the process of the invention can be equilibrated with organopolysiloxanes (1), preferably selected from the group consisting of linear organopolysiloxanes having terminal triorganosiloxy groups, linear organopolysiloxanes having terminal hydroxyl groups, cyclic organopolysiloxanes and copolymers comprising diorganosiloxane and monoorganosiloxane units, which makes it possible, for example, to set the desired molecular weight and also to achieve a specific distribution of the polyoxyalkylene groups in the molecule.

As linear organopolysiloxanes having terminal triorganosiloxy groups, preference is given to using those of the formula $$R^8{}_3SiO(SiR^8{}_2O)_rSiR^8{}_3 \quad (VIII),$$

as linear organopolysiloxanes having terminal hydroxyl groups, preference is given to using those of the formula $$HO—(SiR^8{}_2O)_sH \quad (IX),$$

as cyclic organopolysiloxanes, preference is given to using those of the formula $$(R^8{}_2SiO)_t \quad (X)$$

and as copolymers, preference is given to using those comprising units of the formulae $R^8{}_2SiO$ and $R^8SiO_{3/2}$, where $R^8$ can be identical or different in each case and is as defined for R, r is 0 or an integer from 1 to 1500, s is 0 or an integer from 1 to 1500 and t is an integer from 3 to 12.

The mixing ratios of the organopolysiloxanes (1) and polyoxyalkylene-containing organopolysiloxanes prepared according to the invention which are used in the equilibration which may be carried out if desired are determined purely by the desired proportion of (meth)acrylate groups and polyoxyalkylene groups in the organopolysiloxanes produced in such an equilibration and by the desired mean chain length.

In the equilibration which may be carried out if desired, use is made of acidic or basic catalysts which promote the equilibration, with preference being given to acidic catalysts.

Examples of acidic catalysts are sulfuric acid, phosphoric acid, trifluoromethanesulfonic acid, phosphonitrilic chlorides and acidic catalysts which are solid under the reaction conditions, e.g. acid-activated bleaching earth, acidic zeolites, sulfonated coal and sulfonated styrene-divinylbenzene copolymer, with phosphonitrilic chlorides being preferred as acidic catalysts. Acidic catalysts are preferably used in amounts of from 5 to 1000 ppm by weight (ppm=parts per million), in particular from 50 to 200 ppm by weight, in each case based on the total weight of the organosilicon compounds used.

Examples of basic catalysts are benzyltrimethylammonium hydroxide, tetramethylammonium hydroxide, alkali metal hydroxides, alkaline earth metal hydroxides in methanolic solution, phosphonium hydroxides and silanolates, with alkali metal hydroxides being preferred as basic catalysts. Basic catalysts are preferably used in amounts of from 50 to 10,000 ppm by weight, in particular from 500 to 2000 ppm by weight, in each case based on the total weight of the organosilicon compounds used.

The equilibration which may be carried out if desired is preferably carried out at from 80° C. to 150° C. and at the pressure of the surrounding atmosphere, i.e. at from about 900 to 1100 hPa. However, higher or lower pressures can also be employed if desired.

The equilibration is preferably carried out in from 5 to 20 percent by weight, based on the total weight of the organosilicon compounds used in each case, of a solvent which is immiscible with water, e.g. toluene.

Before working up the mixture obtained in the equilibration, the catalyst can be inactivated.

The process steps according to the invention can be carried out batchwise, semicontinuously or fully continuously.

The process of the invention has the advantage that it is very simple to carry out and gives a very high conversion. In addition, the process of the invention has the advantage that modification of the polymer structures and chain lengths or the silane structures enables the polarity of the copolymers of the invention to be adjusted simply and in a very targeted manner. Furthermore, the process of the invention has the advantage that no transition or heavy metals have to be used and the thermal stress is low.

The novel organosilicon compounds containing (meth) acrylate groups and polyoxyalkylene groups have the advantage that they have a good compatibility with customary acrylate-based surface coatings. In addition, the organosilicon compounds of the invention have the advantage that they can be readily incorporated covalently into surface coatings by means of the remaining acrylate groups and thus give the surface coatings a soft, hydrophobic surface. Furthermore, the organosilicon compounds of the invention have the advantage that the remaining (meth)acrylate groups can be crosslinked by a free radical mechanism or by means of hydrosilylation.

The novel organosilicon compounds containing (meth) acrylate groups and polyoxyalkylene groups, or those prepared according to the invention, can be used for all purposes for which organosilicon compounds containing acrylate groups have also been used hitherto, for example for polymer modification, for the coating of papers, films and textiles, for the treatment of woven fabrics, knitted goods, nonwovens or leathers and also in the production of cosmetics, cleaners, polishes, surface coatings and printing inks.

In the following examples, all parts and percentages are, unless indicated otherwise, by weight. Unless indicated otherwise, the following examples are carried out at the pressure of the surrounding atmosphere, i.e. at about 1000 hPa, and at room temperature, i.e. at about 20° C., or at the temperature which is established on combining the reactants at room temperature without additional heating or cooling. All viscosities mentioned in the examples are based on a temperature of 25° C., unless indicated otherwise.

EXAMPLE 1

50 g (0.0384 mol of C=C) of a diacrylate-terminated polydimethylsiloxane of the formula Q—$SiMe_2$O($SiMe_2$O)$_{54}$—$SiMe_2$—Q, where

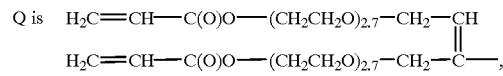

and where Me is a methyl radical, having a mean chain length of 56, a double bond equivalent of about 1300 g/mol and a viscosity of 310 mm$^2$/s are stirred together with 6.04 g (9.6: 10$^{-3}$ mol $NH_2$) of a monoaminated O'-methyl polyglycol of the formula

having a mean chain length of 11 in 11.2 g (0.19 mol) of 2-propanol for two hours at 80° C.

After filtration, the reaction mixture is evaporated to constant weight at 80° C. in a high vacuum (1 mbar). This gives 42.6 g (76% of theory) of an orange-brown, clear oil having a viscosity of 1350 mm$^2$/s (copolymer 1).

EXAMPLE 2

The procedure described in Example 1 is repeated, except that 18.12 g (0.0288 mol of $NH_2$) instead of 6.04 g of the monoaminated O'-methyl polyglycol are used. This gives 54.5 g (80% of theory) of an orange-brown, clear oil having a viscosity of 1730 mm$^2$/s

EXAMPLE 3

The procedure described in Example 1 is repeated, except that 53.3 g (9.6: 10$^{-3}$ mol of $NH_2$) of O-(2-aminoethyl)-O'-methylpolyethylene glycol of the formula

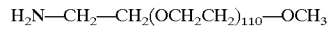

having a mean chain length of 110 are used in place of the 6.04 g of the monoaminated O'-methyl polyglycol and 54.2 g (0.9 mol) instead of 11.2 g of 2-propanol are used. This gives 87.3 g (84.5% of theory) of an orange-brown, clear oil having a viscosity of 25,000 mm$^2$/s.

EXAMPLE 4

The procedure described in Example 3 is repeated, except that 160.0 g (0.0288 mol of NH$_2$) instead of 53.3 g of the O-(2-aminoethyl)-O'-methylpolyethylene glycol and 160.0 g (2.67 mol) instead of 54.2 g of 2-propanol are used. This gives 204.2 g (97.2% of theory) of an orange, clear paste having a viscosity of 47,000 mm$^2$/s at 40° C.

EXAMPLE 5

10 g of copolymer 1, whose preparation is described in Example 1, are admixed with 0.2 g of 2,2'-azobisisobutyronitrile and heated at 100° C. for 3 hours. This gives a completely crosslinked, brownish rubber.

EXAMPLE 6

10 g of copolymer 1, whose preparation is described in Example 1, are stirred with 0.4 g (3.9: 10$^{-3}$ mol) of acetic anhydride for one hour at 80° C. After filtration, the reaction mixture is evaporated to constant weight at 80° C. in a high vacuum (1 mbar). This gives 8.9 g of a brownish, clear oil having a viscosity of 1280 mm$^2$/s.

EXAMPLE 7

50 g (0.103 mol of C=C) of a diacrylate-terminated polydimethylsiloxane of the formula
Q—SiMe$_2$(OSiMe$_2$)$_{13}$OSiMe$_2$—Q, where

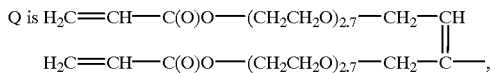

and where Me is a methyl radical, having a mean chain length of 15, a double bond equivalent of about 500 g/mol and a viscosity of 105 mm$^2$/s are stirred together with 16.2 g (0.0258 mol of NH$_2$) of a monoaminated O'-methyl polyglycol of the formula

having a mean chain length of 11 in 13.0 g (0.22 mol) of 2-propanol for two hours at 80° C. After filtration, the reaction mixture is evaporated to constant weight at 80° C in a high vacuum (1 mbar). This gives 58.9 g (89% of theory) of a brown, clear oil having a viscosity of 740 mm$^2$/s.

EXAMPLE 8

The procedure described in Example 7 is repeated, except that 15.5 g of O-(2-aminopropyl)-O'-(2-methoxyethyl)-(polypropylene glycol) of the formula

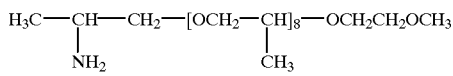

having a mean chain length of 8 are used in place of 16.2 g of the monoaminated O'-methyl polyglycol. This gives 62.4 g (95.3% of theory) of a brown, clear oil having a viscosity of 670 mm$^2$/s.

What is claimed is:

1. An organosilicon compound containing (meth)acrylate groups and oxyalkylene groups and comprising units of the formula

where

R can be identical or different and are each a monovalent, SiC-bonded, substituted or unsubstituted hydrocarbon radical having from 1 to 22 carbon atoms, X are identical or different and are each a radical of the formula —OR$^1$ where R$^1$ is a hydrogen atom or an alkyl radical having from 1 to 8 carbon atoms in which ether oxygen atoms may be present, or a radical of the formula

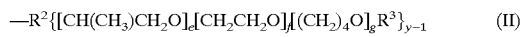

where R$^2$ is an SiC-bonded divalent or trivalent hydrocarbon radical having from 2 to 60 carbon atoms which may be interrupted by one or more oxygen atoms and is substituted by one or more groups of the formulae

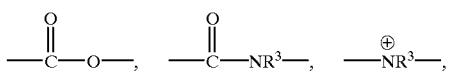

—NHR$^3$—, and —S—, y is, corresponding to the valence of radical R$^2$, 2 or 3, R$^3$ is a hydrogen atom or a hydrocarbon radical having from 1 to 20 carbon atoms which may be substituted by a —C(O)— group, and e, f and g are each, independently of one another, 0 or an integer from 1 to 200, with the proviso that the sum e+f+g≧1, A is a radical of the formula

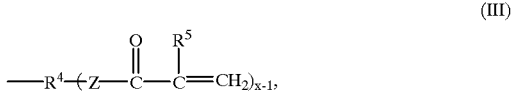

where R$^4$ is a divalent or trivalent hydrocarbon radical having from 2 to 60 carbon atoms which may be interrupted by one or more oxygen atoms, x is, corresponding to the valence of radical R$^4$, 2 or 3, Z is a radical —O— or —NR$^3$— where R$^3$ is as defined above and R$^5$ is a hydrogen atom or a methyl group, A' is a radical of the formula

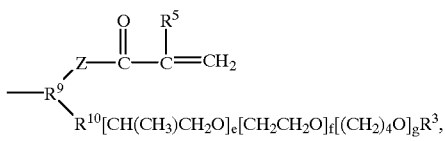

where R$^9$ is a trivalent hydrocarbon radical having from 2 to 60 carbon atoms which may be interrupted by one or more oxygen atoms, R$^{10}$ is a divalent hydrocarbon radical having from 2 to 20 carbon atoms which may be interrupted by one or more oxygen atoms and is substituted by one or more groups of the formulae

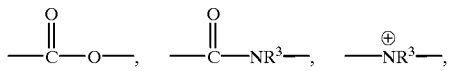

—NHR³—, and —S—,
and R⁵, R³, e, f and g are as defined above,
a is 0, 1 or 2,
u is 0, 1 or 2,
b is 0, 1, 2 or 3 and
c is 0, 1, 2 or 3,
with the proviso that the sum a+b+c+u≦4 and the organosilicon compound contains at least one radical A and at least one radical of the formula (II), or at least one radical A' per molecule.

2. An organosilicon compound as claimed in claim 1 which has the formula

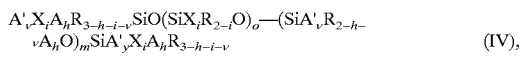 (IV), where X, A, A' and R are as defined above, h can be identical or different and in each case is 0, 1 or 2, i can be identical or different and in each case is 0, 1 or 2, v can be identical or different and in each case is 0, 1 or 2, where h+i+v≦3 in the terminal units and h+v≦2 in the units in the chain, m and o are each 0 or an integer from 1 to 1000, with the proviso that at least one radical of the formula (II) and at least one radical A, or at least one radical A' are present per molecule, and the o units (SiX$_i$R$_{2-i}$O) and the m units (SiA'$_v$R$_{2-h-v}$A$_h$O) can be distributed in any way in the molecule.

3. An organosilicon compound as claimed in claim 1 which has a polyoxyalkylene content of from 2 to 50 percent by weight.

4. An organosilicon compound as claimed in claim 1 which has a (meth)acrylate group content of from 0.001 to 0.2 percent by weight.

5. An organosilicon compound as claimed in claim 2 which has a (meth)acrylate group content of from 0.001 to 0.2 percent by weight.

6. An organosilicon compound as claimed in claim 3 which has a (meth)acrylate group content of from 0.001 to 0.2 percent by weight.

7. A process for preparing organosilicon compounds containing (meth)acrylate groups and oxyalkylene groups, which comprises reacting organosilicon compounds comprising units of the formula A$_d$R$_b$Si(OR¹)$_k$O$_{(4-d-b-k)/2}$ (V), where R can be identical or different and are each a monovalent, SiC-bonded, substituted or unsubstituted hydrocarbon radical having from 1 to 22 carbon atoms, R¹ is a hydrogen atom or an alkyl radical having from 1 to 8 carbon atoms in which ether oxygen atoms may be present, or a radical of the formula

 (II), where e, f, and g are each independently 0 or an integer from 1 to 200 with the proviso that the sum e+f+g≧1, A is a radical of the formula

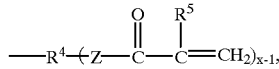 (III)

b is 0, 1, 2 or 3, d is 0, 1 or 2 and k is 0, 1, 2 or 3, with the proviso that the sum d+b+k≦4 and at least two radicals A of the formula (III) if R⁴ is a divalent radical, or at least one radical A of the formula (III) if R⁴ is a trivalent radical, are present per molecule,
with polyoxyalkylenes selected from among monoaminated polyoxyalkylenes of the formula HNR⁶R⁷—[—OCH(CH₃)CH₂]$_e$[CH₂CH₂O]$_f$[(CH₂)₄O]$_g$R³ (VI)

and/or those of the formula

HSR⁷—[—OCH(CH₃)CH₂]$_e$[CH₂CH₂O]$_f$[(CH₂)₄O]$_g$R³ (VI'), where R³ is a hydrogen atom or a hydrocarbon radical having from 1 to 20 carbon atoms which may be substituted by a —C(O)— group, and e, f and g are each, independently of one another, 0 or an integer from 1 to 200, R⁶ is a hydrogen atom or a monovalent hydrocarbon radical having from 1 to 8 carbon atoms, with preference being given to a hydrogen atom, and R⁷ is a divalent hydrocarbon radical having from 1 to 12 carbon atoms.

8. The process as claimed in claim 7, wherein the organosilicon compounds used are organopolysiloxanes containing lateral and/or terminal acrylate or diacrylate groups.

9. The process as claimed in claim 7, wherein the polyoxyalkylenes used are ones of the formula (VI).

10. The process as claimed in claim 8, wherein the polyoxyalkylenes used are ones of the formula (VI).

11. The process as claimed in claim 7, wherein from 0.001 to 0.999 mol of polyoxyalkylene of the formula (VI) and/or (VI') are used per mol of (meth)acrylate radicals in the organosilicon compound comprising units of the formula (V).

12. The process as claimed in claim 8, wherein from 0.001 to 0.999 mol of polyoxyalkylene of the formula (VI) and/or (VI') are used per mol of (meth)acrylate radicals in the organosilicon compound comprising units of the formula (V).

13. The process as claimed in claim 9, wherein from 0.001 to 0.999 mol of polyoxyalkylene of the formula (VI) and/or (VI') are used per mol of (meth)acrylate radicals in the organosilicon compound comprising units of the formula (V).

14. The process as claimed in claim 10, wherein from 0.001 to 0.999 mol of polyoxyalkylene of the formula (VI) and/or (VI') are used per mol of (meth)acrylate radicals in the organosilicon compound comprising units of the formula (V).

* * * * *

UNITED STATES PATENT AND TRADEMARK OFFICE
CERTIFICATE OF CORRECTION

PATENT NO. : 6,160,148
DATED : December 12, 2000
INVENTOR(S) : Jochen Dauth et al.

Page 1 of 1

It is certified that error appears in the above-identified patent and that said Letters Patent is hereby corrected as shown below:

<u>Column 17, claim 2,</u>
Line 20, $A'_vX_iA_hR_{3-h-i-v}SiO(SiX_iR_{2-i}O)_0-(SiA'_vR_{2-h-v}A_hO)_mSiA'_vX_iA_hR_{3-h-i-v}$ should be
-- $A'_vX_iA_hR_{3-h-i-v}SiO(SiX_iR_{2-i}O)_0-(SiA'_vR_{2-h-v}A_hO)_mSiA'_vX_iA_hR_{3-h-i-v}$ --

Signed and Sealed this

Ninth Day of October, 2001

Attest:

NICHOLAS P. GODICI
Attesting Officer
Acting Director of the United States Patent and Trademark Office